United States Patent [19]

Muan et al.

[11] Patent Number: 5,077,260

[45] Date of Patent: Dec. 31, 1991

[54] COMPOSITIONS INVOLVING $V_2O_3$-CAO

[75] Inventors: Arnulf Muan, Lacey Spring, Va.; Mitri S. Najjar, Wappingers Falls, N.Y.

[73] Assignee: Texaco Inc., White Plains, N.Y.

[21] Appl. No.: 531,609

[22] Filed: Jun. 1, 1990

[51] Int. Cl.$^5$ .......................... B01J 23/02; B01J 23/22
[52] U.S. Cl. .................................. 502/340; 502/353; 423/593
[58] Field of Search ............... 502/340, 353, 525, 524; 423/593

[56] References Cited

U.S. PATENT DOCUMENTS

| | | | |
|---|---|---|---|
| 3,843,554 | 10/1974 | Aykan et al. | 502/340 |
| 4,134,852 | 1/1979 | Volin | 423/213.5 |
| 4,618,597 | 10/1986 | Fiato et al. | 502/524 |
| 4,977,130 | 12/1990 | Najjar et al. | 502/351 |

*Primary Examiner*—Anthony McFarlane
*Attorney, Agent, or Firm*—Robert A. Kulason; James J. O'Loughlin; Albert Brent

[57] ABSTRACT

The present invention pertains to novel phases involving $V_2O_3$ and CaO and the method for their preparation. The solid compositions involving $V_2O_3$ and CaO fall on three vertical lines and within the shaded areas of four polygons in a binary composition diagram of $V_2O_3$ and CaO as shown in the drawing herein e.g., FIG. 1. The composition may be used as a catalyst for oxidation or reduction reactions.

12 Claims, 1 Drawing Sheet

COMPOSITIONS INVOLVING V$_2$O$_3$-CAO

BACKGROUND OF THE INVENTION
FIELD OF THE INVENTION

This invention relates to compositions involving V$_2$O$_3$–CaO.

SUMMARY OF THE INVENTION

The present invention pertains to novel solid compositions involving V$_2$O$_3$, CaO and mixtures thereof, and the method for their preparation. The solid compositions comprise three stable intermediate phases designated C$_5$, C$_9$, and CaVO$_3$, as well as the following four mixtures thereof CaO+C$_5$C$_5$+C$_9$; C$_9$+CaVO$_3$, and CaVO$_3$+V$_2$O$_3$. C$_5$ is used herein to designate a complex calcium vanadate of the general formula Ca$_5$V$_3$O$_x$, where x=9.5–12.5. C$_9$ is used herein to designate a complex calcium vanadate of the general formula Ca$_9$V$_6$O$_x$ where x=18–24. These compositions are shown in the accompanying drawing herein e.g. FIG. 1.

The stable compositions involving V$_2$O$_3$ and CaO may be used as novel oxidation-reduction catalysts. The method of preparing solid compositions involving V$_2$O$_3$ and CaO and designated C$_9$ for the vertical line DOEFG, C$_5$ for the vertical line ABNC, CaVO$_3$ for the vertical line HIP, CaO+C$_5$ for the shaded area KMNBA, C$_5$+C$_9$ for the shaded area ABNCFED, C$_9$+CaVO$_3$ for the shaded area DOPIH, and CaVO$_3$+V$_2$O$_3$ for the shaded area HIJK' as shown in the disclosed FIG. 1 comprises the steps of:

(1) heating V$_2$O$_5$ powder having a particle size of less than about 50 microns in an atmosphere in which the partial pressure of oxygen is in the range of about 10$^{-6}$ to 10$^{-10}$ atmosphere, and the CO$_2$/H$_2$ volume ratio is in the range of about 10/1 to 1/1, while gradually increasing the temperature over a temperature range of about 600° C. to 1300° C., and holding the temperature at about 1300° C. for a period to ensure complete reduction of all vanadium to V$^{3+}$;

(2) heating CaCO$_3$ powder having a particle size of less than about 50 microns for a period of about 10 to 14 hrs. at a temperature in the range of about 600° C. to 1100° C.; whereby substantially all of said CaCO$_3$ is converted into CaO;

(3) thoroughly grinding together about 20 to 90 wt. % of V$_2$O$_3$ from (1), with about 80 to 10 wt. % of the material from (2) to produce a mixture having a grain size of less than about 50 microns, (4) pelletizing the mixture from (3) at a pressure of about 5,000 psi; and (5) heating and reacting together the pellets from (4) at a temperature in the range of about 700° C. to 1600° C. for a period in the range of about 12 to 48 hrs., in an atmosphere in which the partial pressure of oxygen is in the range of about 10$^{-6}$ to 10$^{-10}$ atmosphere to produce said compositions involving V$_2$O$_3$ and CaO.

In one embodiment, the pellets from step (5) are cooled to ambient temperature while at substantially the same partial pressure of oxygen as in step (5). Preferably, to prevent undue oxidation and moisture pickup, the cooled pellets are stored in a sealed container.

BRIEF DESCRIPTION OF THE DRAWING

The drawing e.g.

DESCRIPTION OF THE INVENTION

Figure 1:
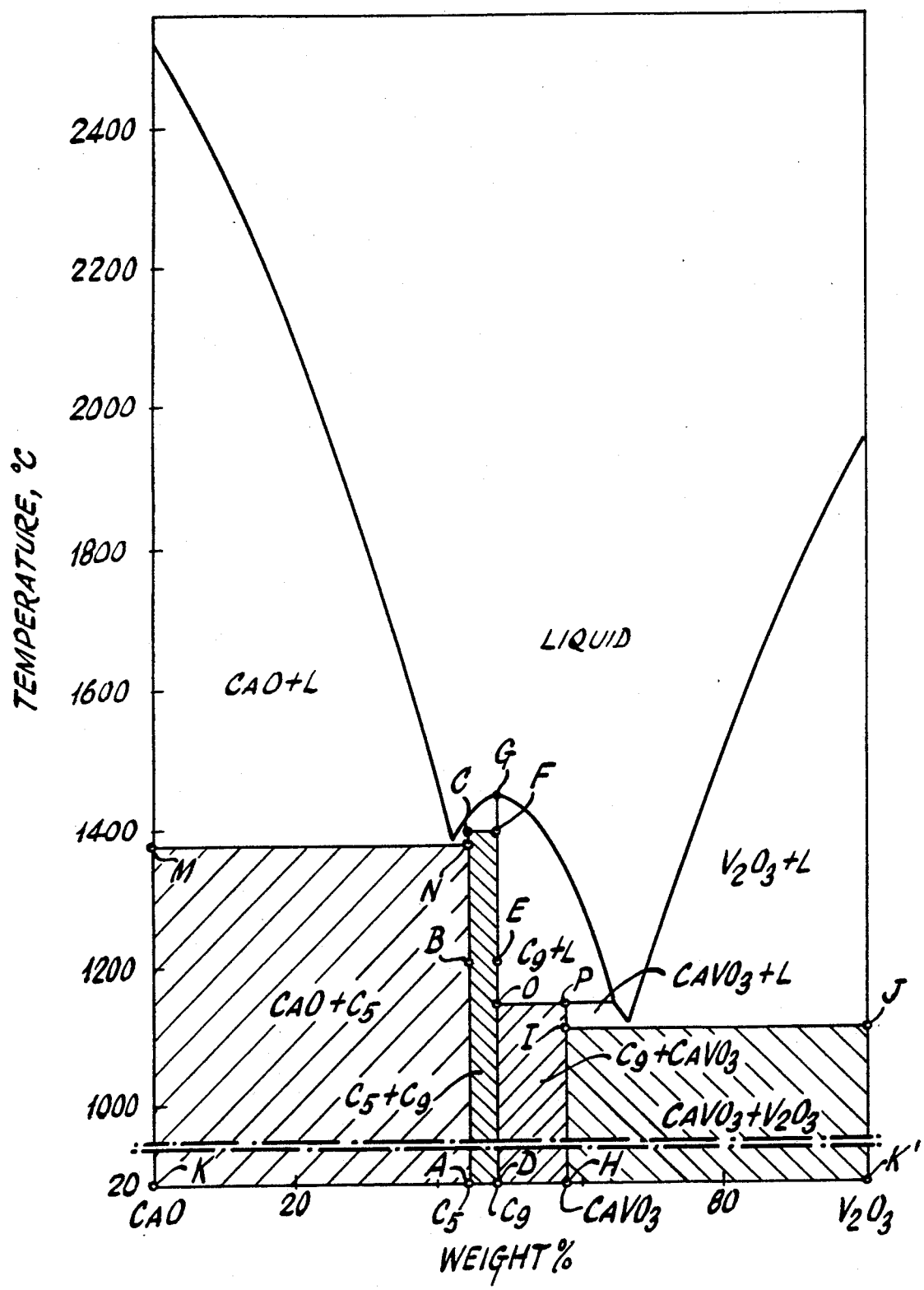
FIG. 1 depicts a binary composition diagram showing the three stable intermediate solid phases designated C$_5$, C$_9$ and CaVO$_3$. Four polygon shaped shaded areas designated CaO+C$_5$, C$_5$+C$_9$, C$_9$+CaVO$_3$, and CaVO$_3$+V$_2$O$_3$ within which useful compositions involving V$_2$O$_3$—CaO are found are also shown in FIG. 1.

The subject newly synthesized solid compositions comprising V$_2$O$_3$—CaO mixtures thereof are depicted in FIG. 1 by the vertical lines C$_5$, C$_9$, and CaVO$_3$; and by the shaded areas CaO+C$_5$, C$_5$+C$_9$, C$_9$+CaVO$_3$, and CaVO$_3$+V$_2$O$_3$ having the vertices and corresponding coordinates in temperature ° C. (Y-axis) and weight % (X-axis). The wt. % CaO is equal to 100-wt. % V$_2$O$_3$. These compositions are disclosed in FIG. 1 and characterized in the manner shown in Tables I to II. Tables I to II give wt. % V$_2$O$_3$ in the composition formed vs temperature ° C. in the reaction zone. The wt. % CaO is equal to 100-wt. % V$_2$O$_3$.

TABLE 1

| C$_5$ | | | C$_9$ | | | CaVO$_3$ | | |
|---|---|---|---|---|---|---|---|---|
| Vertices | Temp °C. | Wt. % V$_2$O$_3$ | Vertices | Temp °C. | Wt. % V$_2$O$_3$ | Vertices | Temp °C. | Wt. % V$_2$O$_3$ |
| A | 20 | 44 | D | 20 | 47 | H | 20 | 57 |
| B | 1200 | 44 | O | 1160 | 47 | I | 1125 | 57 |
| N | 1390 | 44 | E | 1200 | 47 | P | 1160 | 57 |
| C | 1400 | 44 | F | 1400 | 47 | | | |
| | | | G | 1465 | 47 | | | |

TABLE II

| CaO + C$_5$ | | | C$_5$ + C$_9$ | | | C$_9$ + CaVO$_3$ | | | CaVO$_3$ + V$_2$O$_3$ | | |
|---|---|---|---|---|---|---|---|---|---|---|---|
| Vertices | Temp °C. | Wt. % V$_2$O$_3$ | Vertices | Temp °C. | Wt. % V$_2$O$_3$ | Vertices | Temp °C. | Wt. % V$_2$O$_3$O | Vertices | Temp °C. | Wt. % V$_2$O$_3$O |
| K | 20 | 0 | A | 20 | 44 | D | 20 | 47 | H | 20 | 57 |
| M | 1390 | 0 | B | 1200 | 44 | O | 1160 | 47 | I | 1125 | 57 |
| N | 1390 | 44 | N | 1390 | 44 | P | 1160 | 57 | J | 1125 | 100 |
| B | 1200 | 44 | C | 1410 | 44 | I | 1125 | 57 | K' | 20 | 100 |
| A | 20 | 44 | F | 1410 | 47 | H | 20 | 57 | | | |
| | | | E | 1200 | 47 | | | | | | |
| | | | D | 20 | 47 | | | | | | |

New phases of mixed valence states e.g. C$_9$, C$_5$, and CaVO3 in the system V$_2$O$_3$—CaO have been synthesized by the subject invention while under the reducing conditions imposed by a CO$_2$—H$_2$ atmosphere having a volume ratio CO$_2$/H$_2$ in the range of about 10$^{-6}$ to 10$^{-10}$. C$_9$ is a complex calcium vanadate phase of the general formula Ca$_0$ V$_6$O$_x$, where x=18–24. When x is 18, vanadium has an oxidation state of 3. When x is 21, vanadium has an oxidation state of 4. When x is 24, vanadium is in the pentavalent state. $C_5$ is a complex calcium vanadate of the general formula $Ca_5V_3O_x$, where x=9.5–12.5. When x is 9.5, vanadium is trivalent. When x is 11, vanadium is tetravalent. When x is 12.5, vanadium is pentavalent.

The materials are stable over the range of $V_2O_3$ in (wt. %) as shown in Table III. While the minimum temperature that the materials are solid is less than 20° C., the maximum temperature that the materials remain solid is shown in Table III. The wt. % CaO is equal to 100-wt. % $V_2O_3$.

TABLE III

| Material | Wt. % of $V_2O_3$ In Stable Material | Maximum Temp For Solidity, °C. |
|---|---|---|
| CaO + $C_5$ | 0 to 44 | 1390 |
| $C_5$ | 44 | 1400 |
| $C_9$ | 47 | 1465 |
| $C_5$ + $C_9$ | 44 to 47 | 1400 |
| $C_9$ + $CaVO_3$ | 44 to 57 | 1160 |
| $CaVO_3$ + $V_2O_3$ | 57 to 100 | 1125 |

Some typical newly synthesized solid phases involving $V_2O_3$—CaO are shown in the drawing by points B and E. The formulas for these points and the respective coordinates are shown in Table IV.

TABLE IV

| POINT | PHASE | FORMULA | Wt. % $V_2O_3$ (Rem CaO) | AMBIENT TEMPERATURE °C. |
|---|---|---|---|---|
| B | $C_5$ | $Ca_5V_3O_x$, where x = 9.5–12.5 | 44 | 1200 |
| E | $C_9$ | $Ca_9V_6O_x$, where X = 18–24 | 47 | 1200 |

The new phases in the $V_2O_3$—CaO system are synthesized in the following manner: First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$, e.g. in the range of about $10^{-6}$ to $10^{-10}$ atmospheres. This may be accomplished by using a gas mixture of high-purity $CO_2$ and $H_2$ in controlled proportions. The $CO_2/H_2$ ratio by volume is in the range of about 10/1 to 1/1. The relatively low melting point of the starting vanadium oxide ($V_2O_3$), e.g. about 690° C., necessitates heating the oxide slowly. Starting at a temperature of about 600° C., the temperature is gradually increased stepwise over a period of about 12 to 24 hrs. to a final temperature of about 1300° C. At that temperature, the oxide is held at least about 24 hrs. e.g., 24 to 30 hrs. to ensure complete reduction of all vanadium to $V^{3+}$ ($V_2O_3$). The identity of the reaction product, stable solid phases involving $V_2O_3$—CaO, may be confirmed by X-ray diffraction analysis.

Pre-heated analytical-grade oxides having a particle size of less than about 50 microns is used as starting materials for the other components of the stable phases to be synthesized. The $CaCO_3$ is heated for about 10 to 14 hrs. at a temperature in the range of about 600° C. to 1000° C. prior to being used in preparation of the final materials. By this means, substantially all, e.g. more than 95-wt. %, of the $CaCO_3$ is converted into CaO.

The mixtures of the two oxide components are mechanically ground together under acetone in an agate mortar to ensure thorough mixing and a sufficiently small grain size e.g. less than 50 microns. For example, about 90 to 20 wt. % of $V_2O_3$ is ground together with about 10 to 80 wt. % of CaO to produce a mixture having a grain size of less than about 50 microns. Complete formation of the desired compounds in the succeeding heat treatment is thereby promoted. Next, the oxide mixtures are pelletized at a pressure of about 5,000 psi or higher. The pellets may have any conventional size e.g. 1/16" to 1". The pellets are then heated and reacted together at a temperature in the range of about 700° C. to 1600° C., such as about 1100° C. to 1200° C. for a period in the range of about 12 to 48 hrs. (depending on the nature and solidus temperature of the phase to be synthesized ) in a vertical tube furnace with carefully controlled oxygen pressures, in the range of $10^{-6}$ to $10^{-10}$ atmosphere. At the reaction conditions prevailing in the subject process, the phases may be made by solid-state reactions considerably below temperatures at which a liquid phase is present. All of the oxide pellets may be in the solid state; or, one or more of the oxide constituents may be in the molten state. In the manner described previously for preparing $V_2O_3$, the pellets are heated in a furnace atmosphere provided by a gas mixture of high purity $CO_2$ and $H_2$ in various desired mixing ratios, typically, in the range of about 10/1 to 1/1. The selected volume ratios are kept constant for the duration of the synthesis by use of a differential manometer. By this method the oxygen pressure at the specified temperature can be controlled to better than ±1%. The thermodynamic data for the water-gas reaction ($CO_2+H_2=CO+H_2O$), on which the calculations were based, are known with extremely high accuracy (better than 0.1%), and hence the method used ensures reliable accurate control of the oxidation state of vanadium during the synthesis. This is extremely important for optimization of the properties of the finished product.

The new phases that have been synthesized by the subject invention at relatively reducing conditions imposed by a $CO_2$—$H_2$ atmosphere with a $CO_2/H_2$ volume ratio that provides a controlled partial pressure of oxygen in the range of about $10^{-6}$ to $10^{-10}$ have stable oxidation states that vary in the range of about +3 to +5⅓, as shown in Table V.

TABLE V

| $C_5$ | | $C_9$ | |
|---|---|---|---|
| Composition | Oxidation State | Composition | Oxidation State |
| $Ca_5 V_3O_{9.5}$ | 3 | $Ca_9V_6O_{18}$ | 3 |
| $Ca_5 V_3O_{11}$ | 4 | $Ca_9 V_6O_{21}$ | 4 |
| $Ca_5 V_3O_{12.5}$ | 5 | $Ca_9 V_6O_{24}$ | 5 |

The pellets of the stable solid phases involving $V_2O_3$—CaO may be used as a catalyst in the conventional catalytic oxidation or reduction of a reactant material, such as an organic material or an oxygen-containing gas. They offer improved activity, higher yields, and greater stability over a wider temperature range e.g. about 1000° C. or higher, than that which is offered by typical oxidation catalysts. For example, as an oxidation catalyst the subject pellets may be used in the conversion of o-xylene to phthalic anhydride, butane to maleic anhydride, or alcohols to aldehydes or organic acids. As a reduction catalyst, the pellets may be used to reduce the oxides of nitrogen to nitrogen.

As previously noted, the newly identified compounds of C—C—O mixtures contain V in many different oxidation states. This is important for the oxidation-reduction catalysts described above. In addition, they are stable (solids) at relatively high temperatures. The CaO may moderate the acidity and make those materials selective oxidation catalysts.

Various modifications of the invention as herein before set forth may be made without departing from the spirit and scope thereof, and therefore, only such limitations should be made as are indicated in the appended claims.

We claim:

1. Composition produced from $V_2O_3$ and CaO wherein said composition corresponds to phase $C_9$ or $C_5$, and wherein phase $C_9$ has vertices DOEFG in the disclosed FIGURE, and the coordinates shown in the disclosed Table 1; and phase $C_5$ has the vertices ABNC in the disclosed FIGURE, and the coordinates shown in the disclosed Table 1.

2. A composition as provided in claim 1 wherein each of said compositions is a solid solution.

3. The composition of claim 1 wherein said composition is characterized by its ability to catalyze oxidation reactions, and the vanadium in said $C_9$ and $C_5$ phases has an oxidation state selected from the group 3, 4, and 5.

4. A $C_9$ composition as provided in claim 1 having the formula $Ca_9V_6O_x$ where $X=18-24$ as illustrated by point E of the $C_9$ phase in said Figure and having the coordinates in wt. %: $V_2O_3$ 47 and CaO 53.

5. The composition of claim 4 in which the vanadium in said formula has an oxidation state of 3 when X is 18, an oxidation state of 4 when X is 21, and an oxidation state of 5 when X is 24.

6. A $C_5$ composition as provided in claim 1 having the formula $Ca_5V_3O_x$, where $X=9.5-12.5$, as illustrated by point B of the $C_5$ phase in said Figure and having the coordinates in wt. %: $V_2O_3$ 44 and CaO 56.

7. The composition of claim 6 in which the vanadium in said formula has an oxidation state of 3 when X is 9.5, an oxidation state of 4 when x is 11, and an oxidation state of 5 when X is 12.5.

8. Composition produced from $V_2O_3$ and CaO wherein said composition corresponds to a phase selected from the group $CaO+C_5$, $C_5+C_9$, $C_9+CaVO_3$, and $CaVO_3+V_2O_3$; wherein said phase $CaO+C_5$ is depicted by the area circumscribed by the vertices KMNBA as shown in the disclosed Figure and has the coordinates shown in the disclosed Table II, said phase $C_5+C_0$ is depicted by the area circumscribed by the vertices ABNCFED as shown in the disclosed Figure and has the coordinates shown in the disclosed Table II, said phase $C_9+CaVO_3$ is depicted by the area circumscribed by the vertices DOPIH as shown in the disclosed Figure and has the coordinates shown in the disclosed Table II, and said phase $CaVO_3+V_2O_3$ is depicted by the area circumscribed by the vertices HIJK' as shown in the disclosed Figure and has the coordinates shown in the disclosed Table II.

9. The composition of claim 8 wherein said composition is characterized by its ability to catalyze oxidation reactions, and the vanadium in said $C_9$ and $C_5$ has an oxidation state selected from the group 3, 4, and 5.

10. A composition as provided in claim 8 wherein each composition is a solid solution.

11. A method of preparing a composition from $V_2O_3$ and CaO wherein said composition corresponds to a phase selected from the group consisting of $C_5$, $C_9$ $CaVO_3$, $CaO+C_5+C_9$, $C_9+CaVO_3$, and $CaVO_3+V_2O_3$; wherein said phases $C_5$, $C_9$, and $CaVO_3$ are respectively depicted by the vertical lines ABNC, DIEF, and HIP as shown in the disclosed Figure and having the coordinates shown in the disclosed Table I; said phase $CaO+C_5$ is depicted by the area circumscribed by the vertices KMNBA as shown in the disclosed Figure and has the coordinates shown in the disclosed Table II; said phase $C_5+C_9$ is depicted by the area circumscribed by the vertices ABNCFED as shown in the disclosed Figure and has the coordinates shown in the disclosed Table II; said phase $C_9+CaVO_3$ is depicted by the area circumscribed by the vertices DOPIH as shown in the disclosed Figure and has the coordinates shown in the disclosed Table II; and said phase $CaVO_3+V_2O_3$ is depicted by the area circumscribed by the vertices HIJK' as shown in the disclosed Figure and has the coordinates shown in the disclosed Table II; and wherein said method comprises the steps of:

(1) heating $V_2O_5$ powder having a particle size of less than about 50 microns in an atmosphere in which the partial pressure of oxygen is in the range of about $10^{-6}$ to $10^{-10}$ atmosphere, and the $CO_2/H_2$ volume ratio is in the range of about 10/1 to 1/1, while starting at a temperature of about 600° C. and gradually increasing the temperature over a period in the range of about 10 to 14 hrs. to about 1300° C., and holding the temperature at about 1300° C. for a period to ensure complete reduction of all vanadium to $V^{3+}$;

(2) heating $CaCO_3$ powder having a particle size of less than about 50 microns for a period of about 10 to 14 hrs. at a temperature in the range of about 600° C. to 1000° C.; whereby substantially all of said $CaCO_3$ is converted into CaO;

(3) thoroughly grinding together about 20 to 90 wt. % of $V_2O_3$ from (1), with about 80 to 10 wt. % of the material from (2) to produce a mixture having a grain size of less than about 50 microns;

(4) pelletizing the mixture from (3) at a pressure of about 5,000 psi; and (5) heating and reacting together the pellets from (4) at a temperature in the range of about 700° C. to 1600° C. for a period in the range of about 12 to 48 hrs., in an atmosphere in which the partial pressure of oxygen is in the range of about $10^{-6}$ to $10^{-10}$ atmosphere.

12. The process of claim 1 wherein said composition produced from $V_2O_3$ and CaO is a calcium vanadate phase or mixtures thereof.

* * * * *

UNITED STATES PATENT AND TRADEMARK OFFICE
CERTIFICATE OF CORRECTION

PATENT NO. : 5,077,260

DATED : December 31, 1991

INVENTOR(S) : A. Muan; M. S. Najjar

It is certified that error appears in the above-identified patent and that said Letters Patent is hereby corrected as shown below:

Col. 5,
Claim 8  Line 8    Change "$C_o$" to --$C_9$--

Col. 6,
Claim 11 Line 3    After "$C_9$" insert a comma --,--

Line 4    After "$C_9$" insert a comma --,--

Line 5    After "$C_5$" insert --, $C_5$--

Signed and Sealed this

Twenty-sixth Day of October, 1993

Attest:

BRUCE LEHMAN

*Attesting Officer*   *Commissioner of Patents and Trademarks*